US012589295B2

(12) United States Patent
Hu et al.

(10) Patent No.: US 12,589,295 B2
(45) Date of Patent: Mar. 31, 2026

(54) INTERACTION SCENE STARTING METHOD AND APPARATUS, STORAGE MEDIUM, CLIENT, AND SERVER

(71) Applicant: TENCENT TECHNOLOGY (SHENZHEN) COMPANY LIMITED, Shenzhen (CN)

(72) Inventors: Jue Hu, Shenzhen (CN); Chunxiao Ge, Shenzhen (CN); Chen Zeng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 252 days.

(21) Appl. No.: 17/877,831

(22) Filed: Jul. 29, 2022

(65) Prior Publication Data

US 2022/0362666 A1     Nov. 17, 2022

Related U.S. Application Data

(63) Continuation of application No. PCT/CN2021/091858, filed on May 6, 2021.

(30) Foreign Application Priority Data

May 30, 2020    (CN) ......................... 202010480912.9

(51) Int. Cl.
*A63F 13/00* (2014.01)
*A63F 13/35* (2014.01)
*A63F 13/48* (2014.01)

(52) U.S. Cl.
CPC ............. *A63F 13/48* (2014.09); *A63F 13/35* (2014.09); *A63F 2300/53* (2013.01)

(58) Field of Classification Search
CPC ........ A63F 13/497; A63F 13/49; A63F 13/45; A63F 13/52; A63F 13/00; A63F 13/493; A63F 13/55
See application file for complete search history.

(56) References Cited

U.S. PATENT DOCUMENTS 9,919,227 B2     3/2018  Lin et al.
10,057,310 B1 *  8/2018  Grunewald ........ H04N 21/4781
(Continued)

FOREIGN PATENT DOCUMENTS

CN          104780164  A     7/2015
CN          109511016  A     3/2019
(Continued)

OTHER PUBLICATIONS

China National Intellectual Property Administration (CNIPA) Office Action 1 for 202010480912.9 Feb. 19, 2021 13 Pages (including translation).
(Continued)

*Primary Examiner* — David L Lewis
*Assistant Examiner* — Eric M Thomas
(74) *Attorney, Agent, or Firm* — Anova Law Group, PLLC

(57) ABSTRACT

An interaction scene starting method includes displaying a play interface of a target video, the target video corresponding to a recorded play of a game; identifying a first interaction progress point of a virtual interaction scene of the game in the target video; obtaining scene interaction data corresponding to the first interaction progress point from a scene interaction server; and displaying a scene interaction image according to the scene interaction data and enabling playing the game from the first interaction progress point.

20 Claims, 11 Drawing Sheets

(56)                References Cited

U.S. PATENT DOCUMENTS

| 10,635,449 | B2  | 4/2020  | Wang |
| 2009/0011838 | A1 | 1/2009 | Miyamoto |
| 2014/0189753 | A1 | 7/2014 | Cugnini et al. |
| 2016/0067609 | A1 | 3/2016 | Fahmie |
| 2017/0001111 | A1* | 1/2017 | Willette .................. A63F 13/49 |
| 2017/0001122 | A1* | 1/2017 | Leung ................... A63F 13/355 |
| 2017/0006322 | A1* | 1/2017 | Dury .................... H04N 21/254 |
| 2017/0127150 | A1 | 5/2017 | Kuo et al. |
| 2017/0354888 | A1 | 12/2017 | Benedetto et al. |
| 2018/0021684 | A1 | 1/2018 | Benedetto |
| 2020/0206617 | A1 | 7/2020 | Ikenaga |

FOREIGN PATENT DOCUMENTS

| CN | 109525851 | A | 3/2019 |
| CN | 110368686 | A | 10/2019 |
| CN | 110489382 | A | 11/2019 |
| CN | 110636324 | A | 12/2019 |
| CN | 110868607 | A | 3/2020 |
| CN | 110908584 | A | 3/2020 |
| CN | 110947178 | A | 4/2020 |
| CN | 111084983 | A | 5/2020 |
| CN | 111084984 | A | 5/2020 |
| CN | 111603764 | A | 9/2020 |
| CN | 111632373 | A | 9/2020 |
| EP | 2014342 | A1 | 1/2009 |
| IN | 110780789 | A | 2/2020 |
| JP | 2012065831 | A | 4/2012 |
| JP | 2017098948 | A | 6/2017 |
| WO | 2015200737 | A1 | 12/2015 |

OTHER PUBLICATIONS

The World Intellectual Property Organization (WIPO) International Search Report for PCT/CN2021/091858 Aug. 2, 2021 6 Pages (including translation).

The Japan Patent Office (JPO) Notification of Reasons for Refusal for Application No. 2022-539028 and Translation Jun. 12, 2023 17 Pages.

Ichikawa Yuhei"A system to reproduce and share the state of the game, The 78th Annual Conference (3)", "Japan Society of network security", Mar. 10, 2016 (Mar. 10, 2016).

The European Patent Office (EPO) The Extended European Search Report for 21818355.6 Jun. 20, 2023 11 Pages (including translation).

Anonymous:"New Replay and Resume Features Coming in Heart of the Swarm—StarCraft II—Blizzard News" ,Jan. 24, 2013 (Jan. 24, 2013) , XP093053633, Retrieved from the Internet:URL:https://news.blizzard.com/en-gb/starcraft2/10054757/new-replay-and-resume-features-coming-in-heart-of-the-swarm[retrieved on Jun. 12, 2023].

* cited by examiner

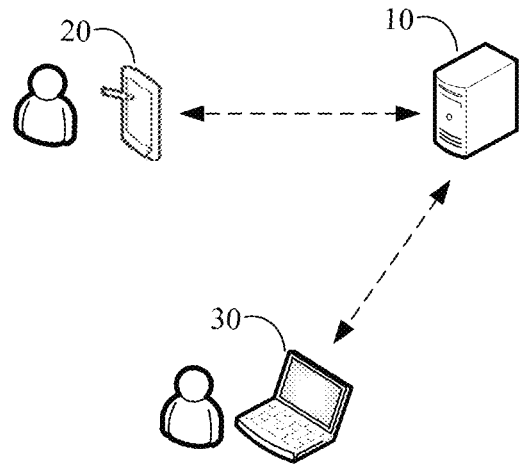

FIG. 1

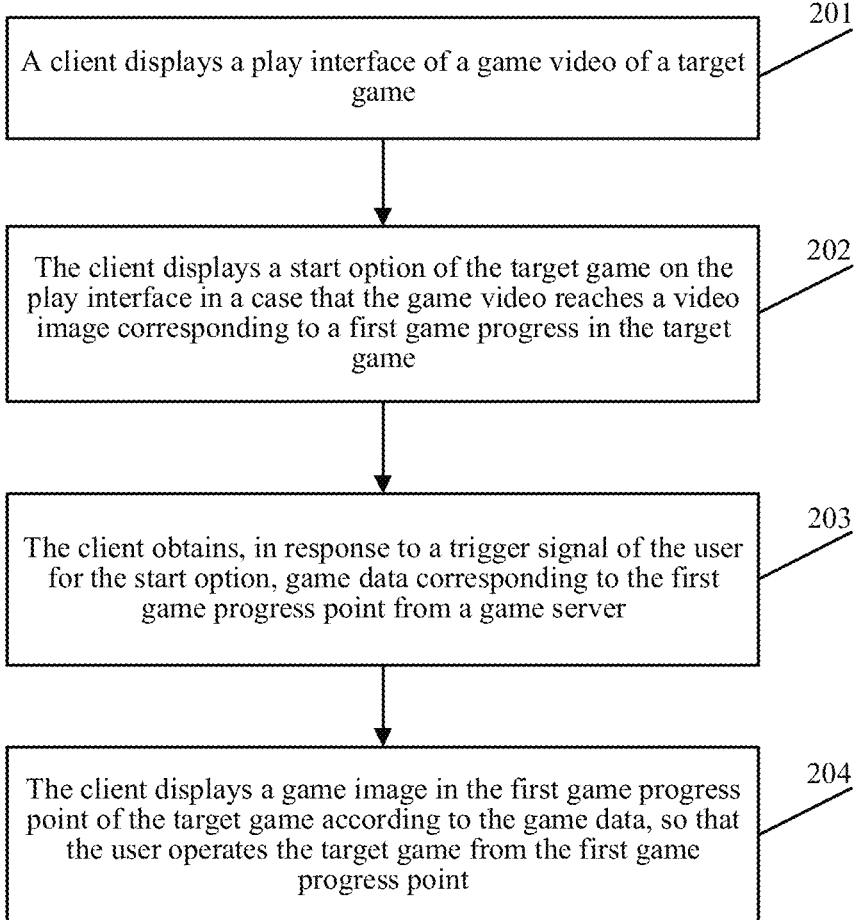

A client displays a play interface of a game video of a target game                                                    201

The client displays a start option of the target game on the play interface in a case that the game video reaches a video image corresponding to a first game progress in the target game                                                    202

The client obtains, in response to a trigger signal of the user for the start option, game data corresponding to the first game progress point from a game server                                                    203

The client displays a game image in the first game progress point of the target game according to the game data, so that the user operates the target game from the first game progress point                                                    204

FIG. 2

 Director Ao
Author of the "Call of embarrassment" series and author of spoof videos of standalone games

Game progress of the author has been archived and click to play

8 in total

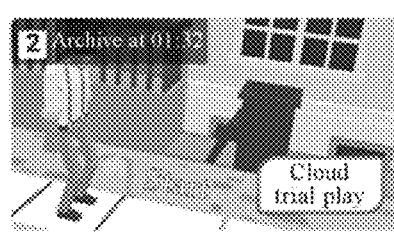
Finally reach the first level

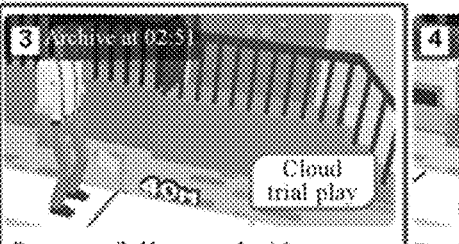
Successfully reach 40 m

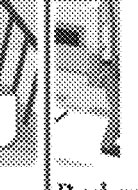
Red ground

〖Director Ao〗Game chou feng che dan

∞0  ▢9  ▦26  March 17th 18:00

Today I recommend a game "long legs walk", also known as "zombie walk", on an Android platform. This game teaches you to walk again and is very entertaining

FIG. 3d

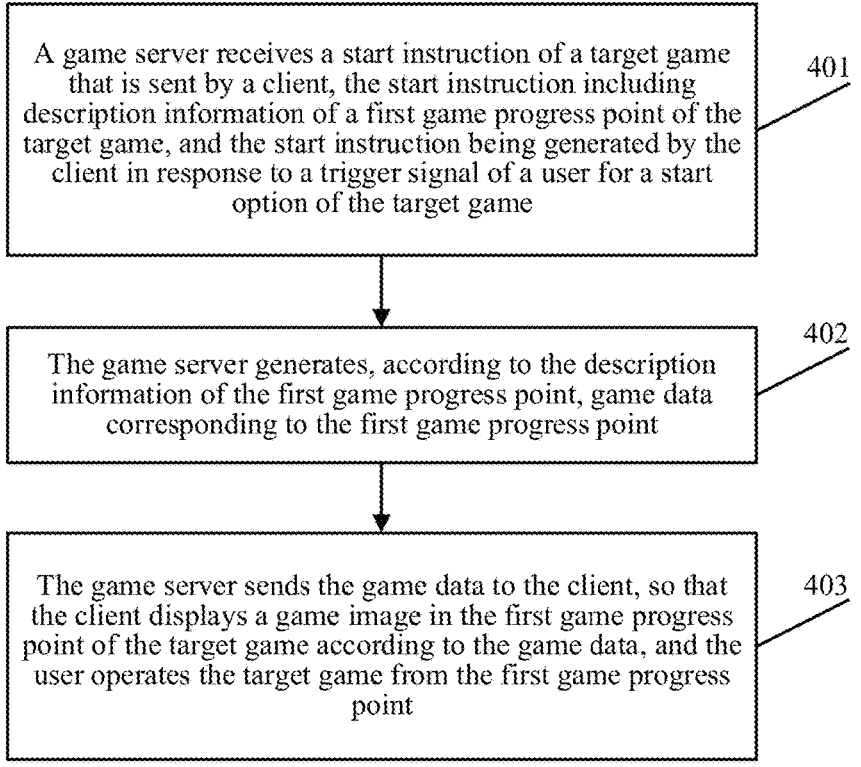

A game server receives a start instruction of a target game that is sent by a client, the start instruction including description information of a first game progress point of the target game, and the start instruction being generated by the client in response to a trigger signal of a user for a start option of the target game — 401

The game server generates, according to the description information of the first game progress point, game data corresponding to the first game progress point — 402

The game server sends the game data to the client, so that the client displays a game image in the first game progress point of the target game according to the game data, and the user operates the target game from the first game progress point — 403

FIG. 4

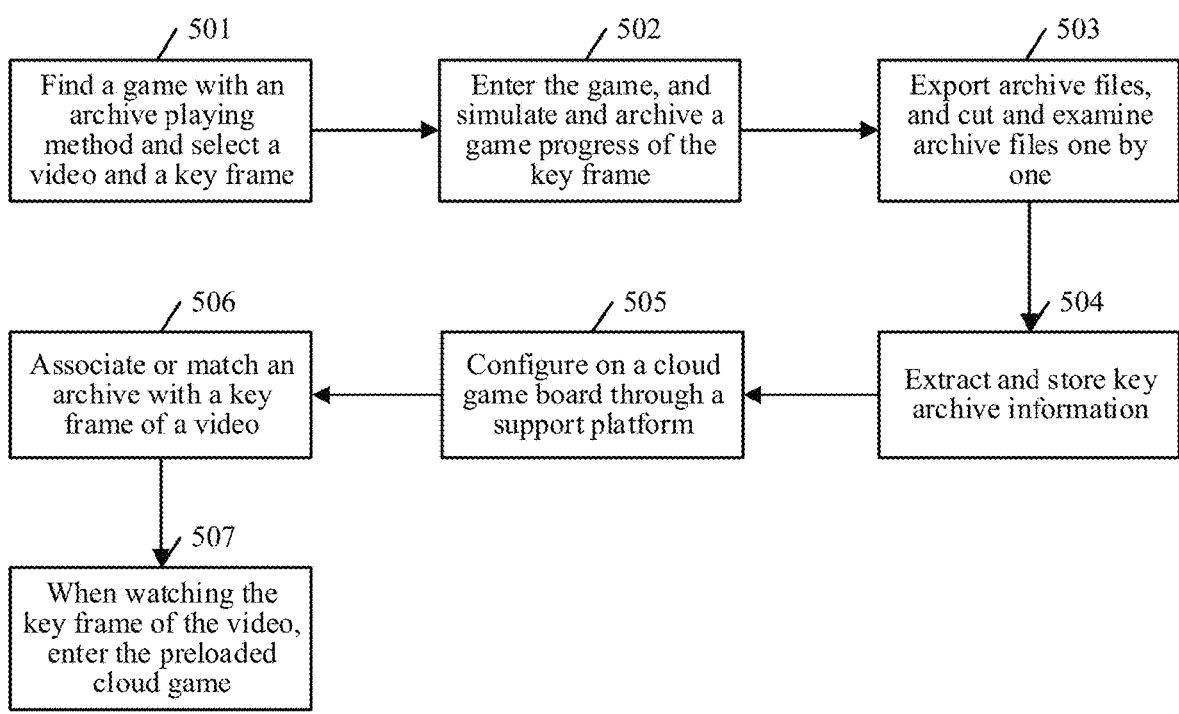

/ 501
Find a game with an archive playing method and select a video and a key frame / 502
Enter the game, and simulate and archive a game progress of the key frame / 503
Export archive files, and cut and examine archive files one by one / 506
Associate or match an archive with a key frame of a video / 505
Configure on a cloud game board through a support platform / 504
Extract and store key archive information / 507
When watching the key frame of the video, enter the preloaded cloud game

FIG. 5a

INTERACTION SCENE STARTING METHOD AND APPARATUS, STORAGE MEDIUM, CLIENT, AND SERVER

RELATED APPLICATIONS

This application is a continuation application of PCT Application No. PCT/CN2021/091858, filed on May 6, 2021, which in turn claims priority to Chinese Patent Application No. 202010480912.9, entitled "INTERACTION SCENE STARTING METHOD AND APPARATUS, STORAGE MEDIUM, CLIENT, AND SERVER" filed with the China National Intellectual Property Administration on May 30, 2020. The two applications are incorporated by reference in their entirety.

FIELD OF THE TECHNOLOGY

This application relates to the field of computer technologies, and in particular, to an interaction scene starting method and apparatus, a storage medium, a client, and a server.

BACKGROUND OF THE DISCLOSURE

As Internet technologies continue to develop and mature, users can watch videos about virtual interaction scenes recorded by other users on the Internet. The virtual interaction scene is a scene in which virtual interaction occurs. For example, in a game scene, a user can watch a virtual interaction scene of a game in a game video recorded by a game broadcaster. Currently, in a process of watching the video, if the user is interested in watching the virtual interaction scene after watching the video for a while and intends to operate the virtual interaction scene, the user needs to exit from a video site to perform complex operations to find a fixed entry, and then needs to perform many repeated operations from the beginning, to reach a desired interaction progress point and operate the virtual interaction scene. For example, in a process of watching a game video, after preliminarily understanding the game through a game video and becoming interested, a user needs to exit from a video site to find a package of the game to download and install the package, and then needs to operate the game again according to what has been learned through the video. As a result, the user can play in a desired game progression point only after spending a lot of time.

Therefore, how to quickly start a scene interaction image that a user is interested in has become a problem that needs to be resolved.

SUMMARY

Embodiments of this application provide an interaction scene starting method and apparatus, a computer-readable storage medium, a client, and a server.

One aspect of this application provides an interaction scene starting method. The method is performed by a client and includes displaying a play interface of a target video, the target video corresponding to a recorded play of a game; identifying a first interaction progress point of a virtual interaction scene of the game in the target video; obtaining scene interaction data corresponding to the first interaction progress point from a scene interaction server; and displaying a scene interaction image according to the scene interaction data and enabling playing the game from the first interaction progress point.

Another aspect of this application provides an interaction scene starting method. The method is performed by a server and includes receiving a start instruction of a virtual interaction scene, the start instruction comprising description information of a first interaction progress point of the virtual interaction scene, and the start instruction being generated in response to a trigger signal for a start option of the virtual interaction scene; generating, according to the description information of the first interaction progress point, scene interaction data corresponding to the first interaction progress point; and transmitting the scene interaction data to a client, wherein the client displays a scene interaction image corresponding to the first interaction progress point of the virtual interaction scene according to the scene interaction data, and enables playing the game from the first interaction progress point.

Another aspect of this application provides an interaction scene starting apparatus, disposed in a client. The apparatus includes: a memory and a processor coupled to the memory. The processor is configured to perform: displaying a play interface of a target video, the target video corresponding to a recorded play of a game; identifying a first interaction progress point of a virtual interaction scene of the game in the target video; obtaining scene interaction data corresponding to the first interaction progress point from a scene interaction server; and displaying a scene interaction image according to the scene interaction data and enabling playing the game from the first interaction progress point. Another aspect of this application provides an interaction scene starting apparatus, disposed in a server. The apparatus includes: a memory and a processor coupled to the memory. The processor is configured to perform: receiving a start instruction of a virtual interaction scene, the start instruction comprising description information of a first interaction progress point of the virtual interaction scene, and the start instruction being generated in response to a trigger signal for a start option of the virtual interaction scene; generating, according to the description information of the first interaction progress point, scene interaction data corresponding to the first interaction progress point; and transmitting the scene interaction data to a client, wherein the client displays a scene interaction image corresponding to the first interaction progress point of the virtual interaction scene according to the scene interaction data, and enables playing the game from the first interaction progress point. Another aspect of this application provides one or more non-transitory computer-readable storage mediums. The computer storage medium stores computer-readable instructions. The computer-readable instructions, when executed by one or more processors, are used to perform the interaction scene starting method according to the first aspect or the second aspect.

BRIEF DESCRIPTION OF THE DRAWINGS

To describe the technical solutions of the embodiments of this application or the existing technology more clearly, the following briefly introduces the accompanying drawings required for describing the embodiments or the existing technology. Apparently, the accompanying drawings in the following description show only some embodiments of this application, and a person of ordinary skill in the art may still derive other drawings from these accompanying drawings without creative efforts.

FIG. 1 is a schematic architectural diagram of a game management system according to an embodiment of the application;

FIG. 2 is a schematic flowchart of an interaction scene starting method according to an embodiment of this application;

FIG. 3*d* is a schematic diagram of playing a game video according to an embodiment of this application;

FIG. 4 is a schematic flowchart of another interaction scene starting method according to an embodiment of this application;

FIG. 5*a* is a schematic flowchart of extracting and configuring an archive file according to an embodiment of this application;

DESCRIPTION OF EMBODIMENTS

Figure 3A:
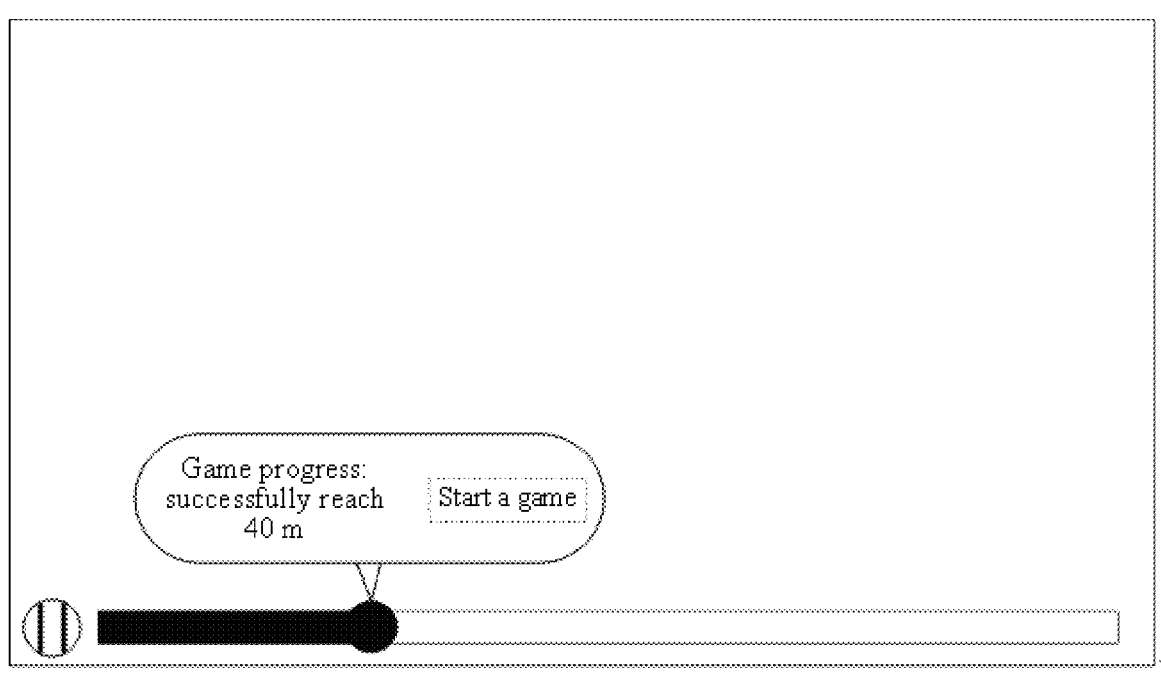
FIG. 3*a* is a schematic diagram of a play interface of a game video according to an embodiment of this application.

The technical solutions in the embodiments of this application are clearly and completely described in the following with reference to the accompanying drawings in the embodiments of this application. Apparently, the described embodiments are merely some rather than all of the embodiments of this application. All other embodiments obtained by a person of ordinary skill in the art based on the embodiments of this application without creative efforts shall fall within the protection scope of this application.

Game progress: Game progress is the progress made when playing a game. Like reading a novel, when a game starts, the progress is at 0%. When the game succeeds, it means that the game experience progress has reached 100%. Game progress usually has multiple threads and multiple branches. For example, a character level is a thread, and when the level reaches the highest level, the game progress of this level is 100%. There are various character weapons and equipment. When all equipment is collected, the progress of equipment collection is 100%. Therefore, game progress is actually an intuitive perception result generated based on comprehensive factors such as the playing time and the operation progress.

Game archive: Game archive is game saving, game storage, or game disk storage, or is abbreviated as "archive", and is digitalized storage information of player progress in an electronic game. Game archive is a data file obtained after all progresses are combined.

Archive solution: Archive solution is a game with a function of storing game progress and reading an archive. Many standalone games have a solution for storing and reading an archive. During storage, an "archive" data file of a game is generated, and generally only the game program can open this file.

Game installation path: In a process of installing a game to a device, an installation location is automatically generated on the device. For example, a folder with the name "D: \ruanjian\steam\anzhuangbao" in a personal computer PC has all data and files required for the game to run, and includes a game archive file and a file location. Therefore, corresponding data can be found according to the corresponding path when the game runs.

ROOT: ROOT is also referred to as a root user, and is a unique super user in Unix (for example, Solaris, AIX, or BSD), a UNIX-like system (for example, Linux or QNX), and Android and iOS mobile device systems. Root user is named because a root user may perform read, write, and execution operations on a root directory. A root user is equivalent to a SYSTEM (XP and older versions)/Trusted Installer (Vista and newer versions) user in the Windows system. A root user has the highest permission in the system, for example, starts or stops a process, deletes or adds a user, adds or disables hardware, or adds a file or deletes all files.

A game scene is used as an example to describe the related technology. In the related technology, after watching a desired game video, a user usually spends a lot of time to start the corresponding game and reach a desired game progress. For example, a player A spends 20 hours playing a game, and then records and posts a game video. A player B sees the game video and intends to play the game. Then, the player B needs to find a package of the game to download and install the package, and then needs to operate again game content that has been learned through the video. As can be seen, the player spends a lot of time to reach the desired game progress. In addition, when the player A and the player B have different operating systems (for example, the player A plays a mobile phone game, and the player B sees the game video on a PC), the player B cannot play the mobile phone game of the player A and a corresponding game progress on the PC.

To resolve the problem that currently a user needs to spend a lot of time to start a corresponding game and play the game in a desired game progress after watching a desired game video, an embodiment of this application provides an interaction scene starting method, to fast start a game, efficiently load game content that the user is interested in, and effectively simplify user operations.

Cloud gaming may also be referred to as gaming on demand, and is an online game technology based on a cloud computing technology. The cloud gaming technology enables a thin-client device with a limited graphics processing and data operation capability to run a high-quality game. In a cloud gaming scene, a game does not run on a game terminal of a player, and instead runs in a cloud server. The cloud server renders the gaming scene to video and audio streams, and transmits the video and audio streams to the game terminal of the player through a network. The game terminal of the player does not need to have a powerful graphics operation and data processing capability, and instead only needs to have a basic streaming media playback capability and a capability of obtaining an instruction inputted by the player and sending the instruction to the cloud server. The player operates the game on the remote server through the network.

Preload: Preload intends to allow a player to play a cloud game in a specified scene (that is, a game progress) after starting the game. Before the player plays the cloud game, an image recognition program automatically controls game login in advance, and the game enters a specified scene through a simulated click. A stage of preloading to the specified game scene is preload.

FIG. 1 is a schematic architectural diagram of a game management system according to an embodiment of the application. The game management system includes a game server 10, a client 20 on a user side, and a client 30 on a development side.

The game server 10 may be an independent physical server, or may be a server cluster including a plurality of physical servers or a distributed system, or may be a cloud server providing a cloud computing service. The game server 10 is configured to provide a capability of processing game data, render game data to video and audio streams, and transmit the video and audio streams to the client 20 on the user side through a network. The game server 10 may complete preloading of the game by loading an archive file of the game, directly enter a game progress corresponding to the archive file in the game, and render game data of the game progress and transmit the rendered game data to the client 20 on the user side through a network. The user can directly see a game image of the game progress on the client 20 and operate the game.

The game server 10 specifically may be a cloud game management system, and is responsible for maintaining cloud game data and processing all configurations of a cloud game and parameter-related logic. OSS is short for operation support system. The system is an operation support system and is a support platform required to develop and operate a telecommunication service. An OSS is a support system for integration of telecommunication operators and information resource sharing, and mainly includes network management, system management, charging, business operation, accounting, customer service, and the like. Systems are organically integrated through a unified information bus. An operation support system includes an operation and maintaining center and a network management center. An operation support system is responsible for inspection and management of communication quality and operation of an entire network, and recording and collecting various data in operation of the entire network. An operation support system has a connection line to each device in the entire network, and performs monitoring and control functions for each device.

The client 20 on the user side and the client 30 on the development side may include electronic devices such as a smartphone, a tablet computer, a notebook, a desktop computer, and a smart watch.

The client 20 is configured to receive game data rendered by the game server 10 and load a corresponding game image according to the game data, and may receive an operation instruction inputted by the user.

The client 30 is configured to archive a game by running the game, obtain an archive file corresponding to each game progress, and upload the archive file of each game progress to the game server 10 for storage.

Specifically, the client 20 may display a play interface of a game video of a target game, when playback of the game video reaches a video image corresponding to a first game progress of the target game, display a start option of the target game on the play interface, in response to a trigger signal of the user for the start option, obtain game data corresponding to the first game progress from the game server 10, and display a game image of the first game progress of the target game according to the game data. Therefore, the user (that is, the player) can operate the target game from the first game progress. As can be seen, based on the processing capability of the cloud game, the game can be fast started, game content that the user is interested in can be loaded efficiently, and user operations can be effectively simplified.

FIG. 1 illustrates the architectural diagram only by using the game scene as an example, and does not limit that the solution of the embodiments of this application is limited to the game scene.

The implementation details of the technical solutions in the embodiments of this application are described below in detail.

An embodiment of this application provides an interaction scene starting solution. The solution may be applied to any application scene of starting a virtual interaction scene, such as a game scene, a cloud tourism scene, and a cloud house viewing scene.

In an embodiment, the interaction scene starting method may be executed by a client. The method may specifically include the following steps: displaying a play interface of a target video; a video image of a virtual interaction scene being displayed in the target video; displaying a start option of the virtual interaction scene on the play interface in a case that playback of the target video reaches a video image corresponding to a first interaction progress point in the virtual interaction scene; obtaining, in response to a trigger signal for the start option, scene interaction data corresponding to the first interaction progress point from a scene interaction server; and displaying a scene interaction image in the first interaction progress point according to the scene interaction data, to operate the virtual interaction scene from the first interaction progress point.

In an embodiment, the method in this embodiment of this application may be applied to a game scene. The target video may be a game video of a target game. The virtual interaction scene is an interaction scene in the target game. An interaction progress point may be a game progress. The first interaction progress point in the virtual interaction scene may be a first game progress in the target game. Displaying the start option of the virtual interaction scene may be displaying the start option of the target game. Scene interaction data may be game data. Operating the virtual interaction scene is operating the target game. The scene interaction image may be a game image. The scene interaction server may be a game server.

In this embodiment of this application, the method includes: displaying a play interface of a target video; a video image of a virtual interaction scene being displayed in the target video; displaying a start option of the virtual interaction scene on the play interface in a case that playback of the target video reaches a video image corresponding to a first interaction progress point in the virtual interaction scene; obtaining, in response to a trigger signal for the start option, scene interaction data corresponding to the first interaction progress point from a scene interaction server; and displaying a scene interaction image in the first interaction progress point according to the scene interaction data, to operate the virtual interaction scene from the first interaction progress point. Therefore, the player may fast start the virtual interaction scene without performing operations that are complex and consume system resources, such as application installation, and can efficiently load the scene interaction image that the user is interested in. This can effectively simplify operations and improve the efficiency, and avoid system resource consumption caused by complex operation.

In an embodiment, before the displaying a start option of the virtual interaction scene on the play interface, the method further includes: obtaining a playback progress of the target video; and in a case that the playback progress of the target video matches feature data corresponding to the first interaction progress point of the virtual interaction scene, determining that playback of the target video reaches the video image corresponding to the first interaction progress point of the virtual interaction scene.

In an embodiment, the feature data includes at least one of a playback duration and a key frame.

In an embodiment, the obtaining, in response to a trigger signal for the start option, scene interaction data corresponding to the first interaction progress point from a scene interaction server includes: obtaining the trigger signal for the start option; in response to the trigger signal, transmitting a start instruction of the virtual interaction scene to the scene interaction server, where the start instruction includes description information of the first interaction progress point, and the start instruction is used to indicate the scene interaction server to generate, according to the description information of the first interaction progress point, the scene interaction data corresponding to the first interaction progress point; and receiving the scene interaction data sent by the scene interaction server.

In an embodiment, the scene interaction data includes at least one of image data and audio data in the first interaction progress point of the virtual interaction scene.

In an embodiment, another interaction scene starting method is provided. The method may be executed by a server and may specifically include the following steps: receiving a start instruction of a virtual interaction scene that is sent by a client, the start instruction including description information of a first interaction progress point of the virtual interaction scene, and the start instruction being generated by the client in response to a trigger signal for a start option of the virtual interaction scene; generating, according to the description information of the first interaction progress point, scene interaction data corresponding to the first interaction progress point; and transmitting the scene interaction data to the client, so that the client displays a scene interaction image in the first interaction progress point of the virtual interaction scene according to the scene interaction data, to operate the virtual interaction scene from the first interaction progress point.

In an embodiment, the method in this embodiment of this application may be applied to a game scene. The target video may be a game video of a target game. The virtual interaction scene is an interaction scene in the target game. An interaction progress point may be a game progress. The first interaction progress point in the virtual interaction scene may be a first game progress in the target game. Displaying the start option of the virtual interaction scene may be displaying the start option of the target game. Scene interaction data may be game data. Operating the virtual interaction scene is operating the target game. The scene interaction image may be a game image. The scene interaction server may be a game server.

In an embodiment, the generating, according to the description information of the first interaction progress point, scene interaction data corresponding to the first interaction progress point includes: querying, according to the description information of the first interaction progress point, a target archive file corresponding to the first interaction progress point; and generating, according to the target archive file, the scene interaction data corresponding to the first interaction progress point.

In an embodiment, the generating, according to the target archive file, the scene interaction data corresponding to the first interaction progress point includes: obtaining a carrying component configured to support the virtual interaction scene to run; loading the target archive file on the carrying component; and starting, on the carrying component, a target program configured to provide the virtual interaction scene, and preloading the virtual interaction scene in the target program based on the target archive file, to generate the scene interaction data corresponding to the first interaction progress point.

In an embodiment, in a game scene, the carrying component configured to support the virtual interaction scene to run is a game board that may install and download a target game program. The target program may be a target game program. An interaction progress point may be a game progress. Scene interaction data may be game data. Therefore, the target archive file may be loaded on the game board. The server may start the target game program on the game board, and preload the target game in the target game program based on the target archive file, to generate game data corresponding to the first game progress.

In an embodiment, the loading the target archive file on the carrying component includes: obtaining a download URL address of the target archive file from an archive table corresponding to the virtual interaction scene; invoking the carrying component to download the target archive file from the archive table based on the download link address; and replacing an archive file included in an archive folder of the virtual interaction scene with the target archive file.

In an embodiment, in a game scene, the archive table corresponding to the virtual interaction scene may be a game archive table. The archive folder of the virtual interaction scene may be an archive folder of the target game.

In an embodiment, the method further includes: receiving an archive file uploaded for each interaction progress point of the virtual interaction scene; and adding the uploaded archive file to the archive table; where the virtual interaction scene includes at least one interaction progress point, the at least one interaction progress point is determined according to a key frame of the target video, and the at least one interaction progress point includes the first interaction progress point.

In an embodiment, in a game scene, the interaction progress point in the virtual interaction scene is a game progress in the target game.

In an embodiment, the method further includes obtaining description information of each interaction progress point; obtaining feature data corresponding to each interaction progress point in the target video, where the feature data includes either or both of a playback duration and a key frame; and transmitting the description information of each interaction progress point and the corresponding feature data to the client.

In an embodiment, the uploaded archive file is obtained when running of the virtual interaction scene reaches a corresponding interaction progress point on the client with a root user permission.

In an embodiment, in a game scene, running of the virtual interaction scene reaches a corresponding interaction progress point may be running of the target game reaches a corresponding game progress.

A game scene is used as an example for illustration. FIG. 2 is a schematic flowchart of an interaction scene starting method based on the game management system shown in FIG. 1 according to an embodiment of this application. The interaction scene starting method is applied to a client, and specifically includes the following steps:

201: The client displays a play interface of a game video of a target game.

The game video may be recorded in advance by a game broadcaster or the like.

Specifically, the client may display a play interface, and play the game video of the target game on the play interface. A user may watch the game video of the target game on the play interface.

202: The client displays a start option of the target game on the play interface in a case that playback of the game video reaches a video image corresponding to a first game progress in the target game.

The first game progress specifically may be any one-off at least one predetermined game progress of the target game. The first game progress corresponds to a playback duration or a video image in a process of playing the game video on the play interface.

Specifically, in a process of playing the game video of the target game on the play interface, the client may obtain a playback progress of the game video, and perform matching between the playback progress and feature data corresponding to the first game progress of the target game. If the playback progress matches the feature data corresponding to the first game progress, the client may determine that playback of the game video reaches a video image corresponding to the first game progress of the target game in the game video, and may display a start option of the target game on the play interface.

As shown in FIG. 3a, when determining that playback of the game video reaches a video image corresponding to the first game progress (that is, successfully reach 40 m) of the target game in the game video, the client may display the start option of the target game on the play interface. The start option may be an operation control or a functional button "start game". The start option is used to trigger start of the target game from the game progress "successfully reach 40 m". In addition to the start option, the client may display description information of the first game progress on the play interface. The description information is used to intuitively describe the feature of the first game progress. The description information may be a game level (for example, entering the third level) or a state of a game character (for example, a distance traveled). The description information is used to help the user to understand the feature of the first game progress. In FIG. 3a, "successfully reach 40 m" may be used as the description information of the first game progress.

In an embodiment, the feature data may include either or both of a playback duration and a key frame.

In an embodiment, the feature data includes a playback duration, and the client determines, based on the playback duration, whether playback of the game video reaches the video image corresponding to the first game progress in the game video. Specifically, the playback progress of the game video obtained by the client includes a playback duration. If the playback duration reaches a playback duration corresponding to the first game progress, the client may determine that playback of the game video reaches the video image corresponding to the first game progress in the game video.

In an embodiment, the feature data includes a key frame, and the client determines, based on a video image, whether playback of the game video reaches the video image corresponding to the first game progress in the game video. Specifically, the playback progress of the game video obtained by the client includes a video image. The current video image is identified and parsed. If the video image played on the play interface is consistent with a key frame corresponding to the first game progress, the client may determine that playback of the game video reaches the video image corresponding to the first game progress in the game video.

In an embodiment, the feature data includes a playback duration and a key frame, and the client determines, based on both the playback duration and the key frame, whether playback of the game video reaches the video image corresponding to the first game progress in the game video. Specifically, the playback progress of the game video obtained by the client includes a playback duration and a video image. If the playback duration reaches a playback duration corresponding to the first game progress and the video image played on the play interface is consistent with a key frame corresponding to the first game progress, the client may determine that playback of the game video reaches the video image corresponding to the first game progress in the game video.

203: The client obtains, in response to a trigger signal of the user for the start option, game data corresponding to the first game progress from a game server.

Specifically, if the user is interested in the first game progress and intends to play the target game from the first game progress, the user may input the trigger signal for the start option. The user specifically may perform a clicking operation or a gesture operation (for example, an "OK" gesture or a "V" gesture). After obtaining the trigger signal of the user for the start option, the client obtains, in response to the trigger signal, the game data corresponding to the first game progress from the game server.

The game data may include image data and/or audio data in the first game progress of the target game.

Figure 3B:
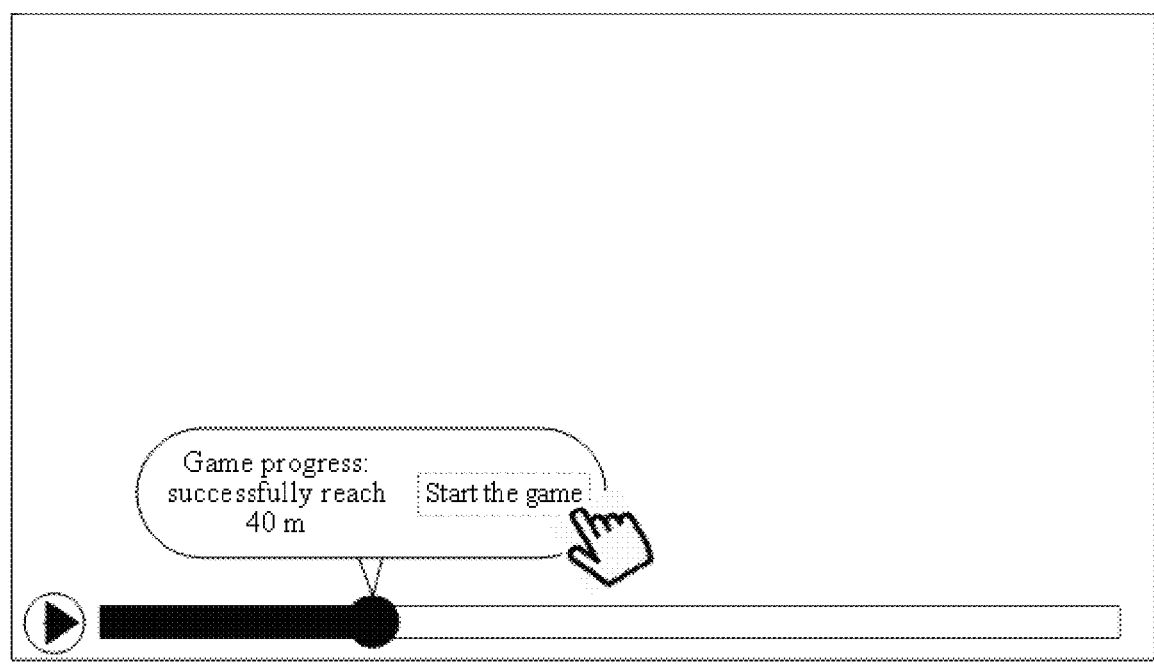
FIG. 3*b* is a schematic diagram of an operation of starting a game according to an embodiment of the application.

As shown in FIG. 3b, if the user is interested in the first game progress (that is, successfully reach 40 m), the user may click on the start option "start game". After determining that the user clicks on "start game", the client may pause playback of the game video, and obtain the game data corresponding to the game progress "successfully reach 40 m" of the target game from the game server.

Figure 3C:
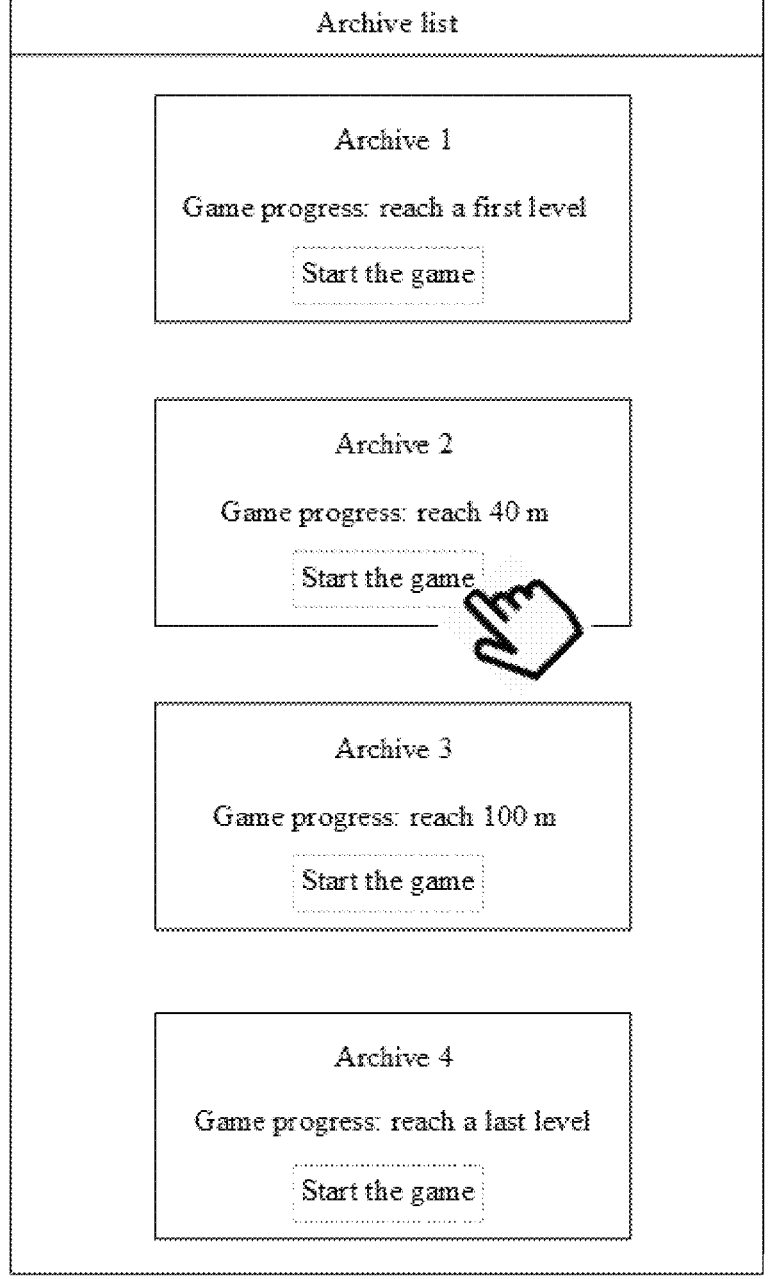
FIG. 3*c* is a schematic diagram of another operation of starting a game according to an embodiment of the application.

In an embodiment, the client may not play the game video of the target game, and instead display a start option and corresponding description information of at least one game progress of the target game. The user may select a desired game progress according to the description information, and input a trigger signal for a start option of the desired game progress. As shown in FIG. 3c, it is assumed that 4 game progresses that may be selected by the user are pre-determined in the target game. The 4 game progresses may be displayed in the form of an archive list (that is, an archive 1 to an archive 4 in FIG. 3c). Specifically, start options and corresponding description information of the 4 game progresses may be displayed. If the user is interested in the game progress "successfully reach 40 m", the user may click on a start option "start game" in the archive 2 to input a trigger signal. After obtaining the trigger signal of the user for "start game" in the archive 2, the client obtains game data corresponding to the game progress "successfully reach 40 m" of the target game from the game server. Therefore, the user may quickly select a desired game progress without watching the game video, and start the target game.

In an embodiment, the client may obtain, in response to the trigger signal of the user for the start option, game data corresponding to the first game progress from the game server in the following specific implementation: The client sends a start instruction of the target game to the game server in response to the trigger signal, where the start instruction includes the description information of the first game progress, and the description information of the first game progress is used to inform the game server of the game data that needs to be obtained. After receiving the start instruction, according to the description information of the first game progress carried in the start instruction, the game server generates the game data corresponding to the first game progress. That is, the server end completes starting of the target game and preloading of game content before the first game progress, and sends the game data to the client. The client receives the game data corresponding to the first game progress.

204: The client displays a game image in the first game progress of the target game according to the game data, so that the user operates the target game from the first game progress.

Specifically, after receiving the game data corresponding to the first game progress, the client may display the game image in the first game progress of the target game according to the game data, so that the user can operate the target game from the first game progress.

The client specifically may display the game image through platforms such as a web page Web, an Android APP, an iOS APP, and a PC that support cloud gaming.

In an embodiment, as shown in FIG. 3d, the user watches, on a client, a game video of a target game "long legs walk" posted by a game broadcaster "Director Ao". 8 game progresses that may be selected by the user are pre-determined in the target game. The user may quickly start the game "long legs walk" from the 8 game progresses. When the user watches the game video, assuming that a playback duration of the game video reaches a playback duration of 2 minutes and 51 seconds corresponding to the game progress "successfully reach 40 m", the client may display a game start menu in a specified location (for example, above the corresponding playback duration of 2 minutes 51 seconds) on the play interface. The game start menu may include a start option "cloud trial play" and corresponding description information "successfully reach 40 m" of the game progress. When the user is interested in the game progress "successfully reach 40 m", the user may click on the "cloud trial play" to input a trigger signal. The client obtains the trigger signal of the user for the "cloud trial play".

In addition, the client may also display the start option "cloud trial play", corresponding description information, and game images of the 8 game progresses of the game "long legs walk". The user may directly select a desired game progress from the 8 game progresses, and input a trigger signal by clicking on the start option "cloud trial play". For example, the user clicks on the start option "cloud trial play" of the game progress "successfully reach 40 m".

Figure 3E:
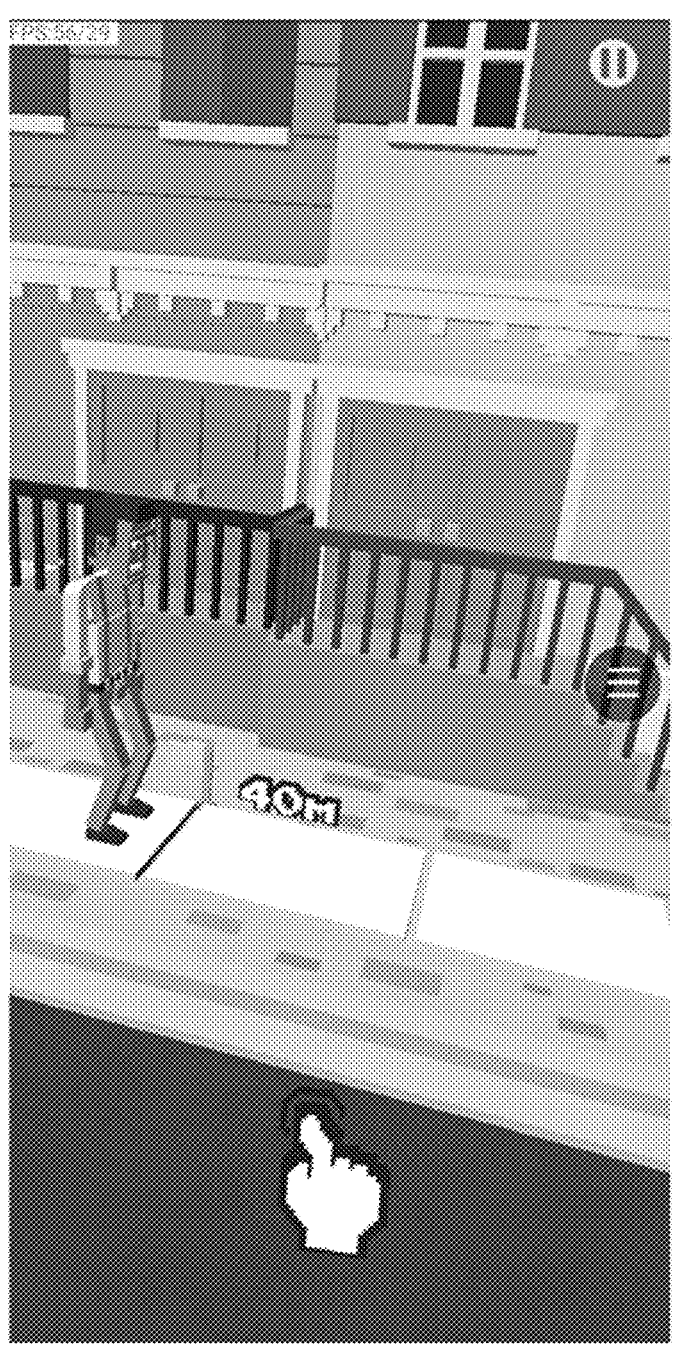
FIG. 3*e* is a schematic diagram of a game image according to an embodiment of the application.

Further, after obtaining the trigger signal of the user for the start option "cloud trial play" of "successfully reach 40 m", the client obtains game data of the game progress "successfully reach 40 m" of the game "long legs walk" from the game server, and renders a game image of "successfully reach 40 m" on a display interface according to the game data. As shown in FIG. 3e, the user can directly play the next level from the game progress "successfully reach 40 m". Therefore, this can fast start the game, efficiently load game content that the user is interested in, and implement a cloud game processing solution "watch and play".

In this embodiment of this application, the client displays a play interface of a game video of a target game, when playback of the game video reaches a video image corresponding to a first game progress of the target game, display a start option of the target game on the play interface, in response to a trigger signal of the user for the start option, obtain game data corresponding to the first game progress from the game server, and display a game image of the first game progress of the target game according to the game data. Therefore, the player can operate the target game from the first game progress. As can be seen, based on the processing capability of the cloud game, the player does not need to install the game and does not need to perform time-consuming and laborious operations, for example, requesting an archive file from a game broadcaster and searching for a game installation directory, the game can be fast started, game content that the user is interested in can be loaded efficiently, and user operations can be effectively simplified.

FIG. 4 is a schematic flowchart of another interaction scene starting method based on the game management system shown in FIG. 1 according to an embodiment of this application. The interaction scene starting method is applied to a game server, and specifically includes the following steps:

401: The game server receives a start instruction of a target game that is sent by a client, the start instruction including description information of a first game progress of the target game, and the start instruction being generated by the client in response to a trigger signal of a user for a start option of the target game.

402: The game server generates, according to the description information of the first game progress, game data corresponding to the first game progress.

Specifically, the game server may provide a capability of serving a cloud game, including starting the target game and preloading the target game, so that the target game runs to a specified game progress. After receiving the start instruction sent by the client, the game server may determine, according to the description information of the first game progress, that the user intends to play the target game from the first game progress, and then start the target game and preload the target game, so that the target game runs to the first game progress, to generate the game data corresponding to the first game progress. For example, the description information of the first game progress is "successfully reach 40 m", and the game server may directly generate, through preloading, game data that exists when a game character successfully reaches 40 m.

In an embodiment, the game server may restore a game progress of the game based on an archive file of the game. This may specifically include: the game server queries, from a game archive library according to the description information of the first game progress, a target archive file corresponding to the first game progress, and generates, according to the target archive file, the game data corresponding to the first game progress. The game archive library stores an archive file corresponding to each game progress of the target game. Each game progress may be selected by watching a game video recorded by a game broadcaster of the target game. The target archive file is generated for the first game progress in advance and is uploaded to the game archive library for storage.

403: The game server sends the game data to the client, so that the client displays a game image in the first game progress of the target game according to the game data, and the user operates the target game from the first game progress.

Specifically, after generating the game data required for restoring the first game progress of the target game, the game server sends the game data to the client, so that the client may display the game image in the first game progress of the target game according to the game data, and the user can operate the target game from the first game progress.

In this embodiment of this application, the game server may receive the start instruction of the target game that is sent by the client, where the start instruction includes description information of the first game progress of the target game, then generate, according to the description information of the first game progress, the game data corresponding to the first game progress, and send the game data to the client, so that the client displays the game image in the first game progress of the target game according to the game data. Therefore, the player can operate the target game from the first game progress. As can be seen, based on the processing capability of the cloud game, the game can be fast started, game content that the user is interested in can be loaded efficiently, and user operations can be effectively simplified. The user does not need to spend a lot of time to perform laborious operations such as installing a game and searching for a game installation directory.

In an embodiment, the game server may obtain a game board installed with the target game, load the target archive file on the game board, start the target game on the game board, and preload the game based on the target archive file, to generate the game data corresponding to the first game progress.

In an embodiment, the game server creates a game archive table. The game archive table includes a download URL address of each archive file stored in the game archive library. The game server may obtain the download URL address of the target archive file from the game archive table, invoke the game board to download the target archive file from the game archive library based on the download URL address, and replace an archive file included in the archive folder of the target game with the target archive file.

In an embodiment, the game server may receive the archive file uploaded for each of at least one game progress of the target game, and add the uploaded archive file to the game archive library. The at least one game progress is determined according to a key frame in the game video of the target game. For each key frame selected from the game video of the target game, a game progress indicated by the key frame is correspondingly selected. The game progress corresponding to the key frame is usually representative. For example, the key frame may be a game image of reaching the first level after skipping the novice guidance, or a game image that exists when a game character travels to x meters.

In an embodiment, the game server may obtain description information of each game progress, and obtain feature data corresponding to each game progress in the game video of the target game. The feature data includes either or both of a playback duration and a key frame. Then, the game server sends the description information of each game progress and corresponding feature data to the client, so that the client may determine, according to the feature data of the game progress, whether playback of the game video reaches a video image corresponding to the game progress.

In an embodiment, the uploaded archive file is obtained when running of the target game reaches a corresponding game progress on the client with a root user permission.

Specifically, the archive file may be queried and uploaded by a developer of a game management system. The developer obtains the target game with an archive solution, obtains the game video of the target game recorded by a game broadcaster, and selects a key frame (that is, determines a game progress) from the game video. Then, the developer may install the target game on the client with a root user ROOT permission (that is, the client on the development side), start playing and simulating a game progress selected from the game video posted by the video broadcaster, for example, allow a character to enter the level at 40 m, then trigger an archive function in the target game, exit from the game, and find an archive file corresponding to a game progress on the installation path of the game. In addition, the developer may also capture screenshots of a game image when playing in a corresponding progress, and upload the game screenshots to the game server as key frames, so that the key frames can be displayed on the client on the user side.

The archive file corresponding to each game progress may be queried in the following manner: An installation path of the target game is obtained. The archive file is usually placed in a file located in "/data/data/peg-name/". Because a peg file usually has 10 MB to 100 MB, the file is excessively large. Therefore, the file needs to be cut once. The file is cut through the exclusion method. For example, a file A is deleted from a peg package, and then the remaining file is loaded to another client to run the target game. If the file can be correctly read to run the target game, the file A is deleted, and then deletion of a file B is attempted, and so on, until a required archive file X is found.

In an embodiment, the archive file may also be uploaded by a game developer of the target game, and the game developer may generate the archive file of each game progress of the target game. Each frame of game image may correspond to a game progress, thus providing various game progresses for the user to select. For example, an API interface may be developed, and a cloud game board can directly modify archive file information on the cloud game board based on a parameter provided by the API interface. When starting the game through cloud gaming, the user can directly enter an image of a corresponding game progress to start playing the game.

In an embodiment, FIG. 5a shows a procedure of extracting and configuring an archive file. The procedure may include: 501: Search for a game with a game archive file and an archive solution, manually select a key frame in a video based on the video (for example, a video recorded by a game broadcaster) of the game, and record a game progress to be simulated. For example, the selected key frame is a game image that exists when the game broadcaster operates a character to walk to the level at 40 m at 2 minutes and 51 seconds in FIG. 3d. 502: Install a corresponding game on a device with a ROOT permission and enter the game, start playing and simulating the game progress of the video broadcaster, for example, allow a character to walk to the level at 40 m, and trigger an archive function in the game. 503: Find an archive file on an installation path of the game. 504: Extract and store key archive information. 505: Compress the archive file and upload the compressed archive file to the game server, and configure the archive file on a corresponding board through a support platform (for example, OSS background). 506: Configure a time node (that is, a corresponding playback duration) of the key frame in the game video. 507: When watching a corresponding key frame (that is, playback of the game video reaches a corresponding duration), the user outputs a game scene prompt message. Herein, the user may directly enter a corresponding game progress to try to play the game.

Figure 5B:
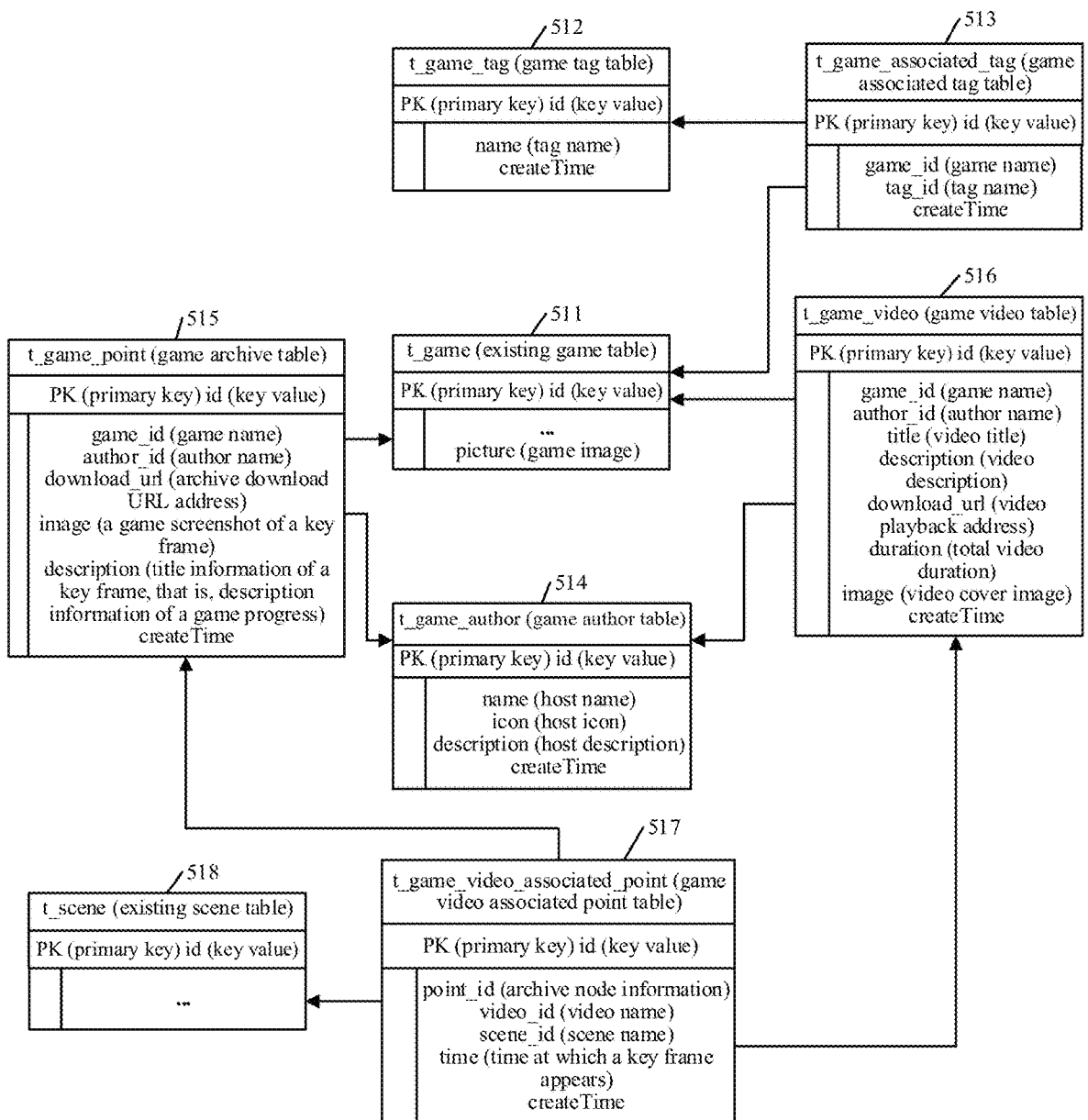
FIG. 5*b* is a view of a relationship between data tables in a database according to an embodiment of this application.

In an embodiment, FIG. 5b is a view of a relationship between data tables in a database.

511. t_game: existing game table, 512. t_game_tag: game tag table, 513. t_game_associated_tag: game associated tag table, 514. t_game_author: game author table, 515. t_game_point: game archive table, 516. t_game_video: game video table, 517. t_game_video_associated_point: game video associated point table, and 518. t_scene: existing scene table.

The relationship between tables may be as follows:

Game and label have an N:N relationship. Different games correspond to multiple game tags, and the same game tag may be used by multiple games.

Game and archive have a 1:N relationship. One game corresponds to multiple archive files.

Game and video have a 1:N relationship. One game corresponds to multiple game videos, which may be multiple game videos recorded by the same game broadcaster or multiple game videos recorded by different game broadcasters.

A broadcaster and archive have a 1:N relationship. One broadcaster corresponds to multiple game archives, that is, multiple key frames (that is, game progresses) may be selected from the game video of the broadcaster.

A game broadcaster and video have a 1:N relationship. One broadcaster corresponds to multiple game videos, and one game broadcaster may record multiple videos for one game or may record videos for different games.

Video and archive have an N:N relationship. Different videos correspond to multiple game archives, and the same game archive may be used by multiple videos. When game progresses are the same, the same archive file may be used. For example, a game progress corresponding to 2 minutes and 10 seconds in a video recorded by a broadcaster A for the target game is the same as that corresponding to 1 minute and 50 seconds in a video recorded by a broadcaster B for the target game. In this case, 2 minutes 10 seconds in the video of the broadcaster A and 1 minute 50 seconds in the video of the broadcaster B may correspond to the same archive file.

Scene and video archive have a 1:N relationship. One scene corresponds to multiple video archives.

Specifically, the existing game table t_game stores a game list supporting an archive solution and includes the target game. The game tag table t_game_tag stores defined tag information, for example, the tag information may include puzzle, shooting, and parkour to classify games. The game associated tag table t_game_associated_tag stores tag information (tag_id) of each game (game_id) in the existing game table. The tag information of the target game may be the parkour category. The game tag is set to help a user to search for a desired type of game. The game broadcaster table t_game_author is used to store basic information of each game broadcaster, for example, a broadcaster name, a broadcaster icon, and a broadcaster description. The game archive table t_game_point stores archive information corresponding to each game progress of each game, for example, a game name (game_id), a corresponding broadcaster name (author_id), a download URL address (download_url) of each archive, a game image screenshot (image) of a key frame, and title information of a key frame, that is, description information of the game progress. For example, in FIG. 3d, the game name of the target game is "long legs walk", the corresponding broadcaster name is "Director Ao", the download URL address of each archive is a storage location of the archive file corresponding to each of the 8 game progresses, the game image screenshot of the key frame is a game image corresponding to a game progress, and the title information of the key frame is the description information, for example, "finally reach the first level" and "successfully reach 40 m". The game video table t_game_video stores a correspondence between a game broadcaster and a game video, and may include a game name (game_id), a corresponding broadcaster name (author_id), a video title (title), a video description, a video download address (download_url), a video total duration, and a video cover image. The game video associated point table t_game_video_associated_point stores an archive corresponding to each game progress and time node information of a game progress in the game video, and may include archive node information (point_id), a video name (video_id), a scene name (scene_id), and a time at which the key frame appears. For example, in FIG. 3d, the key frame of the game progress "successfully reach 40 m" appears at 2 minutes and 51 seconds in the game video.

Figure 5C:
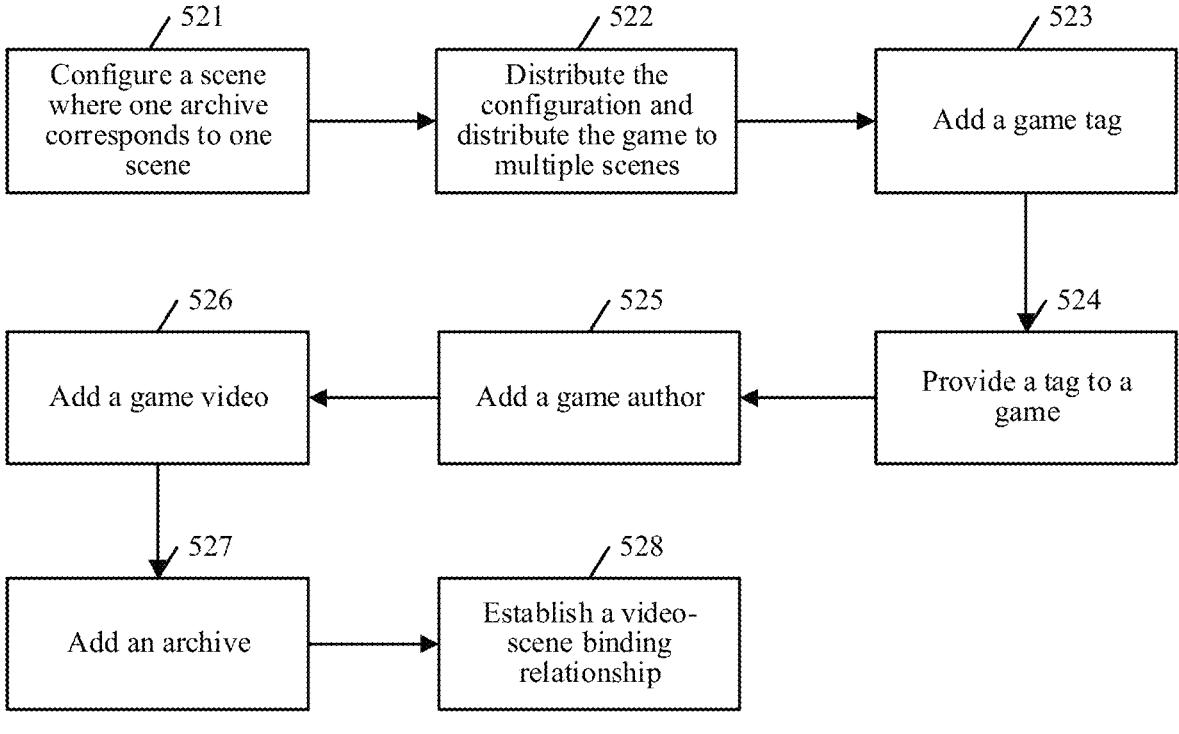
FIG. 5*c* is a schematic flowchart of configuring a binding relationship among a game video, an archive, and a scene according to an embodiment of this application.

In an embodiment, FIG. 5c shows a procedure of configuring a binding relationship among a game video, an archive, and a scene. As shown in the view of the relationship between data tables in FIG. 5b, the procedure of configuring a binding relationship among a game video, an archive, and a scene may include:

521: A game server configures a scene, where one archive corresponds to one scene. That is, the "t_scene" table is used to configure a scene name and establish an index. The scene name may be defined as: independent game-[game name (game_id)]-[broadcaster name (author_id)]-archive [index], for example: independent game-xxx-[old tomato]-archive 3. In another example, in FIG. 3d, independent game-long legs walk-Director Ao-archive 1 (reach the first level) is a scene name of a scene.

522: The game server distributes the configuration and distributes the game to multiple scenes. The archive file is associated with or bound to a corresponding game board, and is to be invoked by the system. The game server needs to select "game name" (which corresponds to the "t_game" table, where the table shows boards installed with this game), then selects a scene name configured in the "t_scene" table, and establishes a correspondence between the download address of the archive file and the scene name.

523: The game server adds a game tag. That is, a tag tag_id of the game is added to the "t_game_tag" table. This may be used by a video platform and may not be set.

524: The game server provides a tag to the game. That is, in the "t_game_associated_tag" table, the game is associated with the tag. This may be used by a video platform and may not be set.

525: The game server adds a game broadcaster. That is, the "t_game_author" table is used to add broadcaster information of the game video, and indicates broadcaster information and a video source of the game video.

526: The game server adds a game video. The video is uploaded, a video identifier VID is obtained, and a video download address "download_url" is obtained. Video information is configured and includes information such as a game name (game_id), a broadcaster name (author_id), a video title (title), a video description (description), a video download address (download_url), a video total duration (duration), and a video cover image (image).

527: The game server adds an archive. That is, the "t_game_point" table is used to configure: game (game_id), broadcaster (author_id), archive download address (download_url), -[key frame] game image screenshot (image),

[key frame] title information (description) (that is, the description information of the game progress).

528: The game server establishes a video-archive-scene binding relationship. That is, in the "t_game_video_associated_point" table, a "scene name" index established in the "t_scene" table is bound to a corresponding video. "Scene name (scene_id), video name (video_id), archive node information (point_id), time point at which the key frame appears (which may be as accurate as seconds) time" needs to be selected, to complete configuration.

Figure 6:
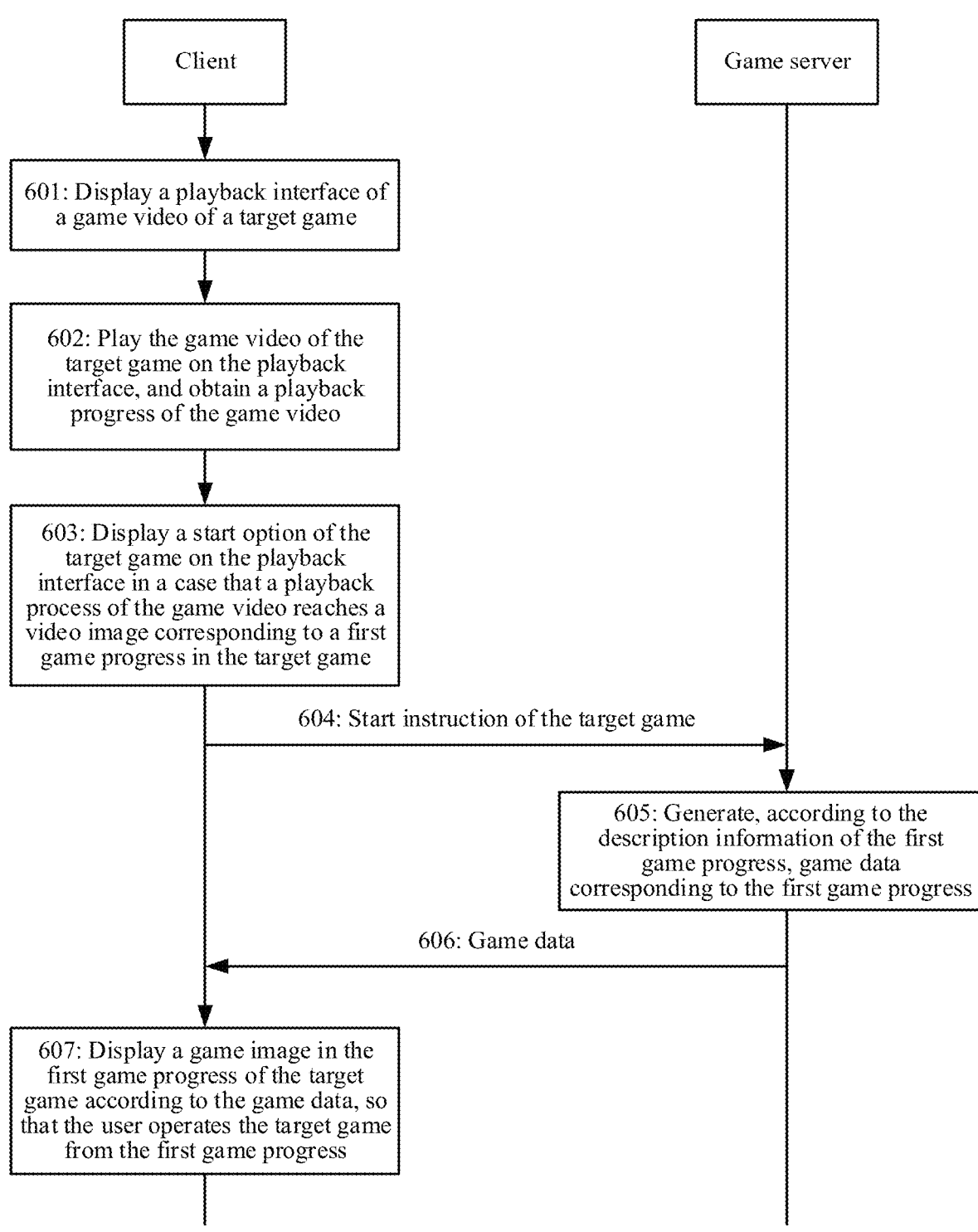
FIG. 6 is a schematic flowchart of still another interaction scene starting method according to an embodiment of this application.

FIG. 6 is a schematic flowchart of still another interaction scene starting method based on the game management system shown in FIG. 1 according to an embodiment of this application. The interaction scene starting method is applied to a client and a game server, and specifically includes the following steps:

601: The client displays a play interface of a game video of a target game.

602: The client plays the game video of the target game on the play interface, and obtains a playback progress of the game video.

603: The client displays a start option of the target game on the play interface in a case that a playback progress of the game video reaches a video image corresponding to a first game progress in the target game.

604: The client sends, in response to a trigger signal of the user for the start option, a start instruction of the target game a game server, where the start instruction includes description information of the first game progress.

605. The game server receives the start instruction, and generates game data corresponding to the first game progress according to the description information of the first game progress.

606. The game server sends the game data to the client.

607: The client receives the game data, and displays a game image in the first game progress of the target game according to the game data, so that the user operates the target game from the first game progress.

For the specific implementation of the foregoing steps 601 to 607, reference may be made to the related description of the foregoing embodiments, and details are not described herein.

Figure 7:
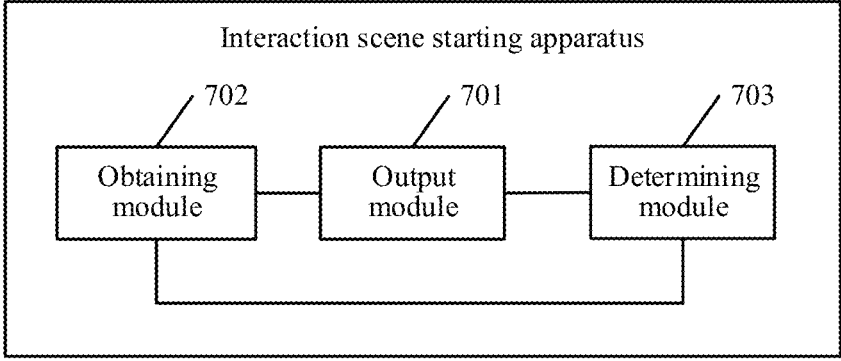
FIG. 7 is a schematic structural diagram of an interaction scene starting apparatus according to an embodiment of this application.

FIG. 7 is a schematic structural diagram of an interaction scene starting apparatus according to an embodiment of this application. The interaction scene starting apparatus is applied to a client and includes:

an output module 701, configured to display a play interface of a target video; a video image of a virtual interaction scene being displayed in the target video;

the output module 701 being further configured to display a start option of the virtual interaction scene on the play interface in a case that playback of the target video reaches a video image corresponding to a first interaction progress point in the virtual interaction scene; and an obtaining module 702, configured to obtain, in response to a trigger signal for the start option, scene interaction data corresponding to the first interaction progress point from a scene interaction server;

the output module 701 being further configured to display a scene interaction image in the first interaction progress point of the virtual interaction scene according to the scene interaction data, to operate the virtual interaction scene from the first interaction progress point.

In an embodiment, the apparatus further includes a determining module 703.

The output module 701 is further configured to play the target video on the play interface.

The obtaining module 702 is further configured to obtain a playback progress of the target video.

The determining module 703 is configured to: in a case that the playback progress of the target video matches feature data corresponding to the first interaction progress point of the virtual interaction scene, determine that playback of the target video reaches the video image corresponding to the first interaction progress point of the virtual interaction scene.

In an embodiment, the feature data includes either or both of a playback duration and a key frame.

In an embodiment, the obtaining module 702 is specifically configured to:

obtain a trigger signal of the user for the start option;

in response to the trigger signal, transmit a start instruction of the virtual interaction scene to the scene interaction server, where the start instruction includes description information of the first interaction progress point, and the start instruction is used to indicate the scene interaction server to generate, according to the description information of the first interaction progress point, the scene interaction data corresponding to the first interaction progress point; and receive the scene interaction data sent by the scene interaction server.

In an embodiment, the scene interaction data includes image data and/or audio data in the first interaction progress point of the virtual interaction scene.

Functions of functional modules of the interaction scene starting apparatus in this embodiment of this application may be specifically implemented according to the method in the foregoing method embodiment. For specific implementation processes thereof, reference may be made to related descriptions in the foregoing method embodiment, which are not described herein again.

Figure 8:
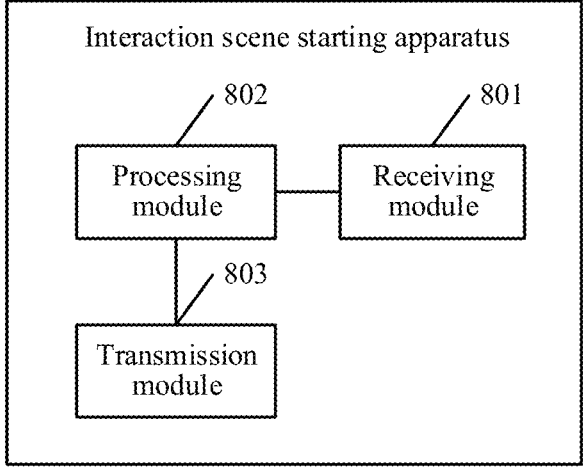
FIG. 8 is a schematic structural diagram of another interaction scene starting apparatus according to an embodiment of this application.

FIG. 8 is a schematic structural diagram of another interaction scene starting apparatus according to an embodiment of this application. The interaction scene starting apparatus is applied to a scene interaction server and includes:

a receiving module 801, configured to receive a start instruction of a virtual interaction scene that is sent by a client, the start instruction including description information of a first interaction progress point of the virtual interaction scene, and the start instruction being generated by the client in response to a trigger signal of a user for a start option of the virtual interaction scene;

a processing module 802, configured to generate, according to the description information of the first interaction progress point, scene interaction data corresponding to the first interaction progress point; and a transmission module 803, configured to transmit the scene interaction data to the client, so that the client displays a scene interaction image in the first interaction progress point of the virtual interaction scene according to the scene interaction data, so that the user operates the virtual interaction scene from the first interaction progress point.

In an embodiment, the processing module 802 is specifically configured to:

query, according to the description information of the first interaction progress point, a target archive file corresponding to the first interaction progress point; and generate, according to the target archive file, the scene interaction data corresponding to the first interaction progress point.

In an embodiment, the processing module 802 is specifically configured to:

obtain a carrying component configured to support the virtual interaction scene to run;

load the target archive file on the carrying component; and start, on the carrying component, a target program configured to provide the virtual interaction scene, and preload the virtual interaction scene in the target program based on the target archive file, to generate the scene interaction data corresponding to the first interaction progress point.

In an embodiment, the processing module 802 is specifically configured to:

obtain a download URL address of the target archive file from an archive table corresponding to the virtual interaction scene;

invoke the carrying component to download the target archive file from the archive table based on the download link address; and replace an archive file included in an archive folder of the virtual interaction scene with the target archive file.

In an embodiment, the receiving module 801 is further configured to: receive an archive file uploaded for each of at least one interaction progress point of the virtual interaction scene; and the processing module 802 is further configured to add the uploaded archive file to the archive table;

where the at least one interaction progress point is determined according to a key frame of the target video, and the at least one interaction progress point includes the first interaction progress point.

In an embodiment, the processing module 802 is further configured to: obtain description information of each interaction progress point; and obtain feature data corresponding to each interaction progress point in the target video, where the feature data includes either or both of a playback duration and a key frame; and the transmission module 803 is further configured to transmit the description information of each interaction progress point and the corresponding feature data to the client.

In an embodiment, the uploaded archive file is obtained when running of the virtual interaction scene reaches a corresponding interaction progress point on the client with a root user permission.

Functions of functional modules of the interaction scene starting apparatus in this embodiment of this application may be specifically implemented according to the method in the foregoing method embodiment. For specific implementation processes thereof, reference may be made to related descriptions in the foregoing method embodiment, which are not described herein again.

Figure 9:
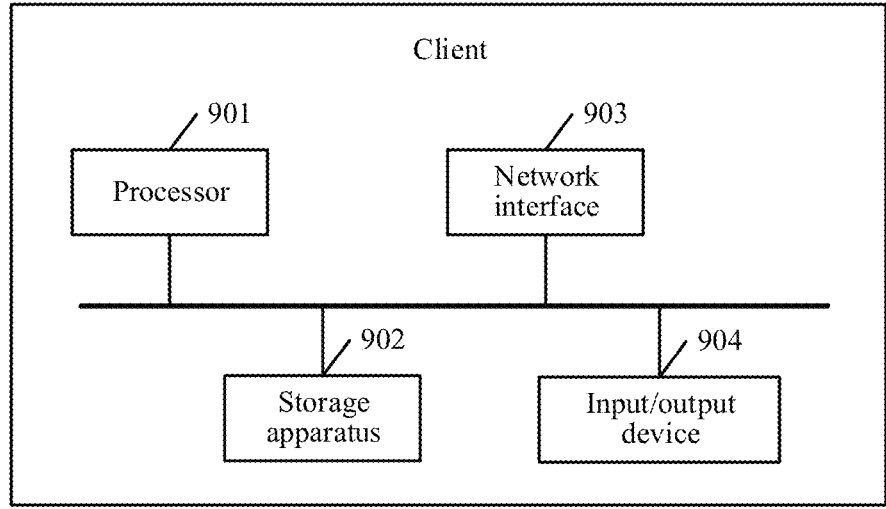
FIG. 9 is a schematic structural diagram of a client according to an embodiment of the application.

FIG. 9 is a schematic structural diagram of a client according to an embodiment of this application. The client in this embodiment of this application includes a power supply module and other structures, and includes one or more processors 901, a storage apparatus 902, a network interface 903, and an input/output device 904. The processor 901, the storage apparatus 902, the network interface 903, and the input/output device 904 may exchange data with each other.

The storage apparatus 902 may include a volatile memory such as a random-access memory (RAM); the storage apparatus 902 may also include a non-volatile memory such as a flash memory, or a solid-state drive (SSD); and the storage apparatus 902 may further include a combination of the foregoing types of memories.

The network interface 903 is configured to send and receive data.

The input/output device 904 may be a display screen, a touchscreen, a microphone, a speaker, or the like, and is configured to detect a touch operation and output a text, an image, sound, or the like.

The processor 901 may be a central processing unit (CPU) 901. In an embodiment, the processor 901 may also be a graphics processing unit 901 (GPU). The processor 901 may also be a combination of a CPU and a GPU. In an embodiment, the storage apparatus 902 is configured to store computer-readable instructions. The processor 901 may invoke computer-readable instructions to perform the following operations: displaying a play interface of a target video through the input/output device 904; displaying a start option of the virtual interaction scene on the play interface through the input/output device 904 in a case that playback of the target video reaches a video image corresponding to a first interaction progress point in the virtual interaction scene; obtaining, in response to a trigger signal for the start option, scene interaction data corresponding to the first interaction progress point from a scene interaction server through the network interface 903; and displaying a scene interaction image in the first interaction progress point of the virtual interaction scene through the input/output device 904 according to the scene interaction data, to operate the virtual interaction scene from the first interaction progress point.

In an embodiment, the processor 901 is further configured to: obtain a playback progress of the target video; and in a case that the playback progress of the target video matches feature data corresponding to the first interaction progress point of the virtual interaction scene, determine that playback of the target video reaches the video image corresponding to the first interaction progress point of the virtual interaction scene.

In an embodiment, the feature data includes either or both of a playback duration and a key frame.

In an embodiment, the processor 901 is specifically configured to: obtain a trigger signal of the user for the start option; in response to the trigger signal, transmit a start instruction of the virtual interaction scene to the scene interaction server through the network interface 903, where the start instruction includes description information of the first interaction progress point, and the start instruction is used to indicate the scene interaction server to generate, according to the description information of the first interaction progress point, the scene interaction data corresponding to the first interaction progress point; and receive, through the network interface 903, the scene interaction data sent by the scene interaction server.

In an embodiment, the scene interaction data includes image data and/or audio data in the first interaction progress point of the virtual interaction scene.

In a specific implementation, the processor 901, the storage apparatus 902, the network interface 903, and the input/output device 904 in the embodiments of this application may perform the interaction scene starting method provided in FIG. 2 or FIG. 6 in the embodiments of this application, and may also perform the interaction scene starting apparatus provided in FIG. 7 in the embodiments of this application. Details are not described herein again.

Figure 10:
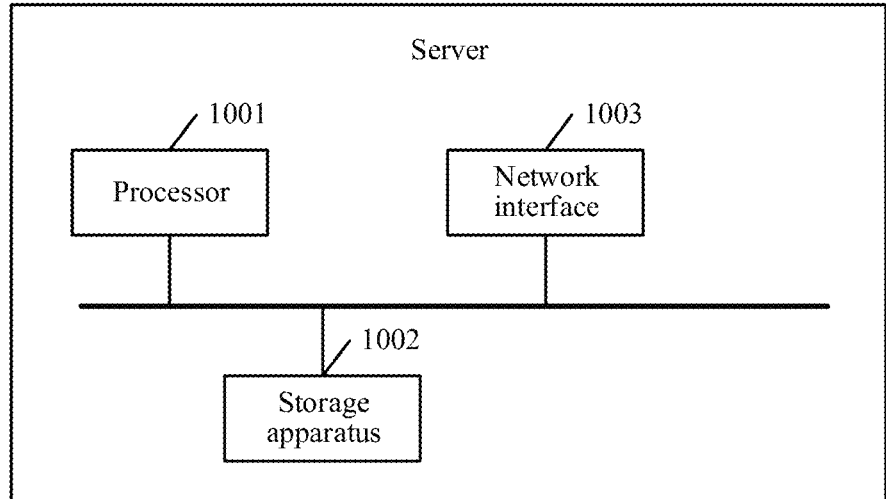
FIG. 10 is a schematic structural diagram of a game server according to an embodiment of this application.

FIG. 10 is a schematic structural diagram of a server according to an embodiment of this application. The server in this embodiment of this application includes a power supply module and other structures, and includes one or more processors 1001, a storage apparatus 1002, and a network interface 1003. The processor 1001, the storage apparatus 1002, and the network interface 1003 may exchange data with each other.

The storage apparatus 1002 may include a volatile memory such as a random-access memory (RAM); the storage apparatus 1002 may also include a non-volatile memory such as a flash memory, or a solid-state drive (SSD); and the storage apparatus 1002 may further include a combination of the foregoing types of memories.

The network interface 1003 is configured to send and receive data.

The processor 1001 may be a central processing unit (CPU) 1001. In an embodiment, the processor 1001 may also be a graphics processing unit 1001 (GPU). The processor 1001 may also be a combination of a CPU and a GPU. In an embodiment, the storage apparatus 1002 is configured to store computer-readable instructions. The processor 1001 may invoke computer-readable instructions to perform the following operations: receiving, through the network interface 1003, a start instruction of a virtual interaction scene that is sent by a client, the start instruction including description information of a first interaction progress point of the virtual interaction scene, and the start instruction being generated by the client in response to a trigger signal of a user for a start option of the virtual interaction scene; generating, according to the description information of the first interaction progress point, scene interaction data corresponding to the first interaction progress point; and transmitting the scene interaction data to the client through the network interface 1003, so that the client displays a scene interaction image in the first interaction progress point of the virtual interaction scene according to the scene interaction data, so that the user operates the virtual interaction scene from the first interaction progress point.

In an embodiment, the processor 1001 is specifically configured to: query, according to the description information of the first interaction progress point, a target archive file corresponding to the first interaction progress point; and generate, according to the target archive file, the scene interaction data corresponding to the first interaction progress point.

In an embodiment, the processor 1001 is specifically configured to: obtain a carrying component configured to support the virtual interaction scene to run; load the target archive file on the carrying component; and start, on the carrying component, a target program configured to provide the virtual interaction scene, and preload the virtual interaction scene in the target program based on the target archive file, to generate the scene interaction data corresponding to the first interaction progress point.

In an embodiment, the processor 1001 is specifically configured to: obtain a download URL address of the target archive file from an archive table; invoke the carrying component to download the target archive file from the archive table based on the download link address; and replace an archive file included in an archive folder of the virtual interaction scene with the target archive file.

In an embodiment, the processor 1001 is further configured to: receive, through the network interface 1003, an archive file uploaded for each of at least one interaction progress point of the virtual interaction scene; and add the uploaded archive file to the archive table;

where the at least one interaction progress point is determined according to a key frame of the target video, and the at least one interaction progress point includes the first interaction progress.

In an embodiment, the processor 1001 is further configured to: obtain description information of each interaction progress point; and obtain feature data corresponding to each interaction progress point in the target video, where the feature data includes either or both of a playback duration and a key frame; and transmit the description information of each interaction progress and the corresponding feature data to the client through the network interface 1003.

In an embodiment, the uploaded archive file is obtained when running of the virtual interaction scene reaches a corresponding interaction progress point on the client with a root user permission.

In a specific implementation, the processor 1001, the storage apparatus 1002, and the network interface 1003 in the embodiments of this application may perform the interaction scene starting method provided in FIG. 4 or FIG. 6 in the embodiments of this application, and may also perform the interaction scene starting apparatus provided in FIG. 8 in the embodiments of this application. Details are not described herein again.

In the foregoing embodiments, description of each embodiment focuses on a different part, and for parts that are not described in detail in one embodiment, reference may be made to the related description of other embodiments.

For brief description, the foregoing method embodiments are redisplayed as a series of action combinations. However, a person skilled in the art is to appreciate that this application is not limited to the described order of the actions, because according to this application, some steps may be performed in other orders or simultaneously. In addition, a person skilled in the art is also to understand that the embodiments described in this specification are all exemplary embodiments, and the involved actions and modules are not necessarily required to this application.

In the embodiments provided in this application, it should be understood that the disclosed apparatus may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces; indirect couplings or communication connections between apparatuses or units may be electric or in other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may be physically separated, or two or more units may be integrated into one unit. The integrated unit may be implemented in the form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in the form of a software product. The software product is stored in a storage medium and includes several instructions for instructing a computer device (which may be a personal computer, a server, or a network device, and may be specifically a processor in a computer device) to perform all or a part of the steps of the foregoing methods described in the embodiments of this application. The foregoing storage medium includes: any medium that can store program code, such as a USB flash drive, a removable hard disk, a read-only memory (English full name: Read-Only Memory, ROM for short), or a random access memory (English full name: Random Access Memory, RAM for short).

The foregoing embodiments are merely intended for describing the technical solutions of this application, but not for limiting this application. Although this application is described in detail with reference to the foregoing embodiments, it should be understood that a person of ordinary skill in the art may still make modifications to the technical solutions described in the foregoing embodiments or make equivalent replacements to some technical features thereof, and these modifications or replacements will not cause the essence of corresponding technical solutions to depart from the spirit and scope of the technical solutions in the embodiments of this application.

What is claimed is:

1. A method for starting an interaction scene, performed by a client, the method comprising:
    displaying a video play interface of a target video, the target video corresponding to a recorded play of a game played by a first player, the first player being a player different from a user of the client, the recorded play having a plurality of predetermined interaction progress points, and each interaction progress point having a corresponding video playback time point;
    in response to a playback duration of the target video reaching the video playback time point, displaying, in the video play interface, a start option on top of a video image of the target video;
    in response to the start option being triggered, identifying a first interaction progress point of a virtual interaction scene of the game in the target video as one of the predetermined interaction progress points corresponding to the currently reached video playback time point, the virtual interaction scene comprising a game character controlled by the first player;
    obtaining scene interaction data corresponding to the first interaction progress point from a scene interaction server; and
    displaying a scene interaction image according to the scene interaction data and enabling continuing playing, on the client, the game by the user from the first interaction progress point by using the scene interaction data corresponding to the first player,
    wherein continuing playing the game by the user comprises: operating, on the client, the same game character based on an input of the user.

2. The method according to claim 1, wherein the method further comprises:
    obtaining a play progress of the target video; and
    when the play progress of the target video matches feature data corresponding to the first interaction progress point of the virtual interaction scene, determining that the target video has reached a video image corresponding to the first interaction progress point of the virtual interaction scene.

3. The method according to claim 2, wherein the feature data comprises at least one of a play duration and a key frame.

4. The method according to claim 1, further comprising:
    displaying a first start option corresponding to the first interaction progress point, the start option being configured to trigger continuing playing of the game from the first interaction progress point;
    transmitting a start instruction of the virtual interaction scene to the scene interaction server, the start instruction being generated in response to a trigger signal for the first start option of the virtual interaction scene, wherein the start instruction comprises description information of the first interaction progress point, and the start instruction instructs the scene interaction server to generate, according to the description information of the first interaction progress point, the scene interaction data corresponding to the first interaction progress point; and
    receiving the scene interaction data from the scene interaction server.

5. The method according to claim 1, wherein the scene interaction data comprises at least one of image data and audio data in the first interaction progress point of the virtual interaction scene.

6. A method for starting an interaction scene, performed by a server, the method comprising:
    receiving, from a client on a user terminal, a start instruction of a virtual interaction scene, the start instruction comprising description information of a first interaction progress point of the virtual interaction scene, and the start instruction being generated in response to a trigger signal for a start option presented on top of a video image of a target video played on the user terminal, the start option corresponds to a virtual interaction scene in a recorded play of a game played by a first player, the first player being a player different from a user of the client, the virtual interaction scene comprising a game character controlled by the first player, the recorded play having a plurality of predetermined interaction progress points, and each interaction progress point having a corresponding video playback time point, and the start option being presented in response to a playback duration of the target video reaching the video playback time point;
    generating, according to the description information of the first interaction progress point, scene interaction data corresponding to the first interaction progress point; and
    transmitting the scene interaction data to the client, wherein the client displays a scene interaction image corresponding to the first interaction progress point of the virtual interaction scene according to the scene interaction data, and enables continuing playing the game from the first interaction progress point by using the scene interaction data corresponding to the first player, wherein continuing playing the game by the user comprises: operating, on the client, the same game character based on an input of the user.

7. The method according to claim 6, wherein the generating, according to the description information of the first interaction progress point, scene interaction data corresponding to the first interaction progress point comprises:
    querying, according to the description information of the first interaction progress point, a target archive file corresponding to the first interaction progress point; and
    generating, according to the target archive file, the scene interaction data corresponding to the first interaction progress point.

8. The method according to claim 7, wherein the generating, according to the target archive file, the scene interaction data corresponding to the first interaction progress point comprises:

obtaining a carrying component configured to support the virtual interaction scene;

loading the target archive file on the carrying component; and starting, on the carrying component, a target program configured to provide the virtual interaction scene, and preloading the virtual interaction scene in the target program based on the target archive file, to generate the scene interaction data corresponding to the first interaction progress point.

9. The method according to claim 8, wherein the loading the target archive file on the carrying component comprises:

obtaining a download URL address of the target archive file from an archive table corresponding to the virtual interaction scene;

invoking the carrying component to download the target archive file from the archive table based on the download link address; and replacing an archive file comprised in an archive folder of the virtual interaction scene with the target archive file.

10. The method according to claim 6, wherein the method further comprises:

receiving an archive file uploaded for each interaction progress point of the virtual interaction scene; and adding the uploaded archive file to the archive table, wherein the virtual interaction scene comprises one or more interaction progress points, each interaction progress point is determined according to a key frame of the target video, and one or more interaction progress point comprises the first interaction progress point.

11. The method according to claim 10, wherein the method further comprises:

obtaining description information of each interaction progress point;

obtaining feature data corresponding to each interaction progress point in the target video, wherein the feature data comprises a play duration and/or a key frame; and transmitting the description information of each interaction progress point and the corresponding feature data to the client.

12. The method according to claim 10, wherein the uploaded archive file is obtained when the virtual interaction scene reaches a corresponding interaction progress point on a client with a root user permission.

13. An interaction scene starting apparatus, disposed in a client, the apparatus comprising a memory and a processor coupled to the memory, the processor being configured to perform:

displaying a video play interface of a target video, the target video corresponding to a recorded play of a game played by a first player, the first player being a player different from a user of the client, the recorded play having a plurality of predetermined interaction progress points, and each interaction progress point having a corresponding video playback time point;

in response to a playback duration of the target video reaching the video playback time point, displaying, in the video play interface, a start option on top of a video image of the target video;

in response to the start option being triggered, identifying a first interaction progress point of a virtual interaction scene of the game in the target video as one of the predetermined interaction progress points corresponding to the currently reached video playback time point, the virtual interaction scene comprising a game character controlled by the first player;

obtaining scene interaction data corresponding to the first interaction progress point from a scene interaction server; and displaying a scene interaction image according to the scene interaction data and enabling continuing playing, on the client, the game by the user from the first interaction progress point by using the scene interaction data corresponding to the first player, wherein continuing playing the game by the user comprises: operating, on the client, the same game character based on an input of the user.

14. The apparatus according to claim 13, wherein before the displaying a start option of the virtual interaction scene on the play interface, the method further comprises:

obtaining a play progress of the target video; and when the play progress of the target video matches feature data corresponding to the first interaction progress point of the virtual interaction scene, determining that the target video has reached a video image corresponding to the first interaction progress point of the virtual interaction scene.

15. The apparatus according to claim 14, wherein the feature data comprises at least one of a play duration and a key frame.

16. The apparatus according to claim 13, wherein the processor is further configured to perform:

transmitting a start instruction of the virtual interaction scene to the scene interaction server, wherein the start instruction comprises description information of the first interaction progress point, and the start instruction instructs the scene interaction server to generate, according to the description information of the first interaction progress point, the scene interaction data corresponding to the first interaction progress point; and receiving the scene interaction data from the scene interaction server.

17. An interaction scene starting apparatus, disposed in a server, the apparatus comprising a memory and a processor coupled to the memory, the processor being configured to perform:

receiving, from a client on a user terminal, a start instruction of a virtual interaction scene, the start instruction comprising description information of a first interaction progress point of the virtual interaction scene, and the start instruction being generated in response to a trigger signal for a start option presented on top of a video image of a target video played on the user terminal, the start option corresponds to a virtual interaction scene in a recorded play of a game played by a first player, the first player being a player different from a user of the client, the virtual interaction scene comprising a game character controlled by the first player, the recorded play having a plurality of predetermined interaction progress points, and each interaction progress point having a corresponding video playback time point, and the start option being presented in response to a playback duration of the target video reaching the video playback time point;

generating, according to the description information of the first interaction progress point, scene interaction data corresponding to the first interaction progress point; and transmitting the scene interaction data to the client, wherein the client displays a scene interaction image corresponding to the first interaction progress point of the virtual interaction scene according to the scene interaction data, and enables continuing playing the game from the first interaction progress point by using the scene interaction data corresponding to the first player, wherein continuing playing the game by the user comprises: operating, on the client, the same game character based on an input of the user.

18. The method according to claim 1, further comprising:

obtaining, the plurality of interaction progress points corresponding to the recorded play;

displaying a plurality of start options, each start option corresponding to one of the interaction progress points;

in response to the first start option corresponding to the first interaction progress point being triggered, obtaining the scene interaction data corresponding to the first interaction progress point.

19. The method according to claim 18, further comprising:

displaying the plurality of start options in a list, wherein each start option is displayed with description information of the interaction progress point corresponding to the start option.

20. The method according to claim 18, further comprising:

displaying indications of the plurality of interaction progress points corresponding to the recorded play in a play progress bar of the target video; and displaying the first start option when a play progress of the target video reaches a video image corresponding to the first interaction progress point.

* * * * *